2,834,756

PROCESS FOR PREPARING AMINE-ALDEHYDE RESINOUS COMPOSITIONS AND PRODUCT OBTAINED

Tzeng Jiueq Suen, New Canaan, and Yun Jen and Sewell T. Moore, Stamford, Conn., assignors to American Cyanamid Company, New York, N. Y., a corporation of Maine No Drawing. Application June 10, 1954
Serial No. 435,931

8 Claims. (Cl. 260—72)

This invention relates to novel resinous compositions. More particularly this invention relates to the method of production of novel resinous compositions wherein the reactants present and the process employed during the formation thereof are carefully regulated. Further, this invention relates to the resinous compositions, their method of production and articles produced therefrom.

In the process of our invention a defined series of procedural steps is followed wherein a polyalkylene polyamine, a dihaloalkane, an alkali metal cyanate or thiocyanate and formaldehyde are reacted to yield a novel resinous composition. The reactants employed and the procedural steps followed will be set forth more fully hereinbelow. The resinous compositions produced are water-soluble and find employment in the treatment of textiles, cellophane and the like. These compositions may also be employed in molding and laminating operations and may also be used for sizing glass fibers. These compositions are also useful in the field of adhesives. Another particular use in which the novel resinous compositions may be employed is in the preparation of cellulosic webs including paper improved wet and dry tensile strength composed of cellulosic fibers bonded together by a content of said novel resin.

It is therefore an object of our invention to produce a novel resinous composition. It is a further object of our invention to produce a novel resinous composition by a defined series of procedural steps. These and other objects of our invention will be discussed more fully hereinbelow.

The preparation of the novel resinous compositions of the present invention is carried out in a process comprising four principal steps. An alkylene polyamine having an alkylene group of 2–4 carbon atoms is initially reacted with a dihaloalkane containing not more than 4 carbon atoms and containing at least 2 and not more than 3 chain carbon atoms between the halogen atoms thereof. This reaction is run at least to substantial completion so that the product contains no organically bound halogen. When reaction is substantially complete, a polyalkylene polyamine is obtained which as an aqueous syrup containing 60–65% total solids has a viscosity substantially higher than $Z_3$ on the Gardner-Holdt scale at 25° C., equivalent to a viscosity of more than about A on said scale when diluted with water to about 33% resin solids. Inasmuch as it is not convenient to measure the viscosity at 60–65% solids, the viscosity of the high molecular weight polyalkylene polyamines is described herein in terms of their viscosity at 33% resin solids. Resin solids of the high molecular weight polyalkylene polyamine solution obtained by reacting the alkylene polyamine with the dihaloalkane is determined by totaling the weight of the materials employed and any water added, deducting the weight of the hydrogen halide formed and dividing by the total weight of the solution.

In the second step of the process of our invention the polyalkylene polyamine is fully neutralized with an acid. Thirdly, the high molecular weight polyalkylene polyamine salt formed by the neutralization step is then reacted with an alkali metal cyanate or thiocyanate. The fourth step in the process is the reaction of the product of step 3 of the process with formaldehyde, preferably at an alkaline pH, to obtain a thermosetting reaction product.

A polyalkylene polyamine represented by the general formula $$H_2N(C_mH_{2m}NY)_pC_mH_{2m}NH_2$$

wherein Y is selected from the group consisting of H and $C_mH_{2m}NH_2$, m is an integer of from 2 to 4 and p is an integer of from 0 to 4 is reacted as the initial step with a dihaloalkane represented by the general formula $$X—C_nH_{2n}—X$$

wherein X is a halogen having an atomic weight greater than 21 and n is an integer of not more than 4 and containing at least 2 and not more than 3 chain carbon atoms between the halogen atoms thereof. Polyalkylene polyamines falling within the scope of the general formula set forth above are such as 1,2-ethylenediamine; trimethylenediamine; 1,2 - propylenediamine; 1,3 - propylenediamine; 1,2-butylenediamine; 1,3-butylenediamine; 1,4-butylenediamine; diethylene triamine; triethylene tetramine; tetraethylene pentamine; 3,3'-iminobis propylamine; 3,3',3''-nitrilo-trispropylamine; and the like. The polyalkylene polyamine employed should contain at least 2, but not more than 4 chain carbon atoms. The alkylene groups may be substituted by non-ionic groups but the polyalkylene polyamine, as a whole, should be water-soluble. Preferred amines are those which are essentially composed of the lower alkylene linkages such as $$—HN—CH_2—CH_2—NH—$$

or $$—HN—CH_2—CH_2—CH_2—NH—$$

since these amines are readily available, freely water-soluble and yield ultimate resins having desired properties. The dihaloalkanes which may be employed in the process of our invention are those in which the halogen has an atomic weight greater than 21, e. g., chlorine, bromine and iodine. Representative compounds are such as 1,2-dichloroethane; 1,2-dibromoethane; 1,2-diiodoethane; 1,2 - dichloropropane; 1,3 - dichloropropane; 1,3-dibromopropane; 1,3-diiodopropane; and the like. These dihaloalkanes have a total of not more than about 4 carbon atoms and contain at least 2 and not more than 3 chain carbon atoms between the halogen atoms thereof.

The dihaloalkane and the polyalkylene polyamine are reacted in a molar proportion of from about 0.5:1.0 to about 1.2:1.0, respectively. The initial reactants are so chosen that the sum of the chain carbon atom represented by n and m in the general formulas in the initial reaction product is an integer of from 5 to 6. Therefore, it will be seen that the reaction product of compounds such as 1,2-dihaloalkane and a polyethylene polyamine such as diethylene triamine fall outside of the scope of this invention and should be avoided in order to obtain best results. We have found that, when the sum of the chain carbon atoms in the initial reaction product is less than 5, there is a tendency for cyclic compounds to be formed during the condensation reaction. The formation of the cyclic compounds when the sum of the chain carbon atoms is 4 would limit the molecular weight of the ultimate reaction product to a relatively small value and is therefore to be avoided. In order to assure that there will be no cyclic group formation in the condensation product of our invention, it is necessary that the sum of the chain carbon atoms in the condensation product, as represented by $n$ and $m$ in the general formula, be 5 or 6. By judicially selecting the reactants of the initial condensation, it is possible to obtain a reaction product free of cyclic groups.

The initial reaction between the dihaloalkane and the polyalkylene polyamine is carried out at a temperature ranging from room to reflux, preferably from about 50° C. to reflux. Reaction is continued at this temperature until the condensation product reaches a viscosity within the order of from about A to about T at 33% resins solids measured at 25° C. on the Gardner-Holdt scale; preferably from B to O. During the initial reaction step, it is preferred that the mol ratio of dihaloalkane to polyalkylene polyamine be within the order of from about 0.7:1.0 to about 1:1. This initial reaction is carried out until there is no free dihaloalkane present in the reaction mixture. The reaction is advantageously carried out by the use of water as solvent. When the amount of acid evolved during the reaction is large compared to the number of nitrogen atoms present, an acid acceptor such as triethanolamine, triethylamine, N-methylmorpholine and the like may be used.

It will be realized that when a compound containing 3 chain carbon atoms such as a trimethylenediamine is reacted with a compound containing 2 chain carbon atoms such as 1,2-dichloroethane, a chain is formed which contains ethylenic linkages, and that the 1,2-dichloroethane may then react with the nitrogen atom terminating these ethylenic linkages and then form six-membered cyclic groups in the compound. However, repeated tests have shown that the ultimate properties of the resinous composition formed from reacting initially a 3 chain carbon polyamine (or dihaloalkane) with a 2 chain carbon dihaloalkane (or polyamine) is such that, when compared with the properties of a resinous composition prepared from reacting initially a 2 chain carbon polyamine with a 2 chain carbon dihaloalkane, ring formation occurs only to a very limited or minimal extent, if at all.

After the initial reaction has been carried out to obtain a reaction product having the viscosity range as set forth above, a sufficient amount of an acid is added to the reaction mixture to form the complete polyamine salt. The amount of the acid added to the mixture is easily calculated by those skilled in the art by determining the number of amine and halogen functional groups originally present in the initial reactants.

Inasmuch as in the initial materials used one halogen atom is equivalent to one N atom, the amount of acid added is equivalent to the excess N atoms present in the reaction mixture. The acids that may be added to the reaction mixture are such as hydrochloric, hydrobromic, hydroiodic, sulfuric acid, formic and the like. By adding a sufficient amount of the acid to the reaction product, the complete polyamine salt is thus formed.

The polyamine salt formed is next reacted with an alkali metal cyanate or thiocyanate. The alkali metal compounds, as are well known, are such as lithium, sodium, potassium and the like. Representative of cyanate and thiocyanate compounds that may be employed in our invention are such as lithium cyanate, sodium cyanate, potassium cyanate, sodium thiocyanate, potassium thiocyanate and the like. The amount of the alkali metal cyanate or thiocyanate that is used to react with the polyamine salt is based on the number of nitrogen atoms contained in said salt. It is preferred that from about 0.9 to about 1.5 mols of the alkali metal cyanate or thiocyanate be used per nitrogen atom contained in the polyamine salt. An amount of the cyanate or thiocyanate greater than 1.5 mols per atom of nitrogen in the salt may be employed if desired but no advantages are thereby realized. The reaction between the polyamine salt and the alkali metal cyanate or thiocyanate is exothermic and reaction is complete when the exotherm or exothermic heat of reaction ceases. Reaction is generally completed in a period of from about 5 minutes to about 120 minutes when the reaction occurs at temperatures from about 25° C. up to the reflux temperature of the mixture. It is preferred, however, that the reaction be carried out at temperatures within the range of from about 50° C. to about 80° C. in a period of from about 5 minutes to about 45 minutes. As previously stated, completion of the reaction is easily recognized when the exotherm ceases.

The final step in the formation of the resinous composition of our invention is to react formaldehyde with the reaction mixture prepared as set forth above. While it is preferred to react formaldehyde with the reaction mixture to form the resinous compositions, other compounds engendering formaldehyde such as paraformaldehyde and trioxane may be employed if desired. The amount of formaldehyde used is based on the mols of the alkali metal cyanate or thiocyanate present in the reaction mixture. Thus, from about 1:1 to about 3:1, preferably 1:1 to 2:1, mols of formaldehyde per mol of the alkali metal cyanate or thiocyanate will be introduced into the reaction mixture. Reaction is carried out at temperatures ranging from about 25° C. up to the reflux temperature of the mixture. This reaction is carried out at a pH that is neutral, acid or alkaline. Best control of the reaction is afforded by performing the condensation at a pH preferably in the order of from about 7 to 10. While the reaction may take place at room temperature, it is preferred that elevated temperatures be employed to expedite the final step in the process of our invention. At elevated temperatures the reaction may be completed in a period of from about 10 to about 180 minutes, preferably from about 30 to about 120 minutes.

The resinous composition thus formed is a water-soluble material. The resinous syrup may be diluted with water to any desired solids content for employment in the sizing of glass fibers and the like. If desired, the resinous syrup may be spray dried to yield a composition that may find employment in molding operations.

In order that those skilled in the art may more fully understand the inventive concept herein presented, the following examples are given by way of illustration and not limitation. All parts are parts by weight.

Example 1

131 parts of 3,3-iminobispropylamine and 87.5 parts of ethylene dichloride are reacted in the presence of 50 parts of water. After 2 hours' refluxing, 200 parts of water are added and the resulting resin has a viscosity of N on the Gardner-Holdt scale. 156 parts of the above resinous syrup are neutralized with 40 parts of 37.5% hydrochloric acid. The polyamine hydrochloride formed is then reacted with 84 parts of potassium cyanate for 2 hours at 75° C. To this condensate 162 parts of a 37% aqueous solution of formaldehyde are added and reacted for 15 minutes at 68° C. The final resinous syrup is diluted to 13.8% solids with water.

Example 2

330 parts of ethylene dichloride were mixed with 200 parts of water. While stirring, 524.8 parts of 3,3'-iminobispropylamine were introduced. The heat of solution of the amine raised the mixture temperature from 25° C. to 56° C. From there on the exothermic heat of reaction raised the temperature further to reflux (80° C.). After 3 hours' refluxing, the resinous product at 58% resin solid concentration attained a viscosity beyond the Gardner-Holdt scale. On dilution the product showed a viscosity of $Z_2$ at 48.5% resin solid, or equivalently, a viscosity of F at 32.9% on the same scale measured at 25° C.

154.5 parts of the above polymer at 32.9% resin concentration were acidified with 43.3 parts of 37.5% hydrochloric acid. The heat of neutralization brought the temperature up to 54° C. 84.5 parts of potassium cyanate having a purity of 96% were added. The reaction was again exothermic and after addition the temperature soon reached 78° C. After reacting at 75° C. for 1 hour, 100 parts of water were added followed by 162 parts of 37% formaldehyde. The syrup was aged at 55° C. for 30 minutes and it was diluted to 15% calculated resin solid with water. The resin was stable for more than one month when aged at 40° C. and more than 3 months at room temperature. This resin showed excellent adhesive properties when applied on cellulosic materials.

*Example 3*

56.5 parts of trimethylene dichloride, 62 parts of water and 73 parts of triethylene tetramine were mixed. The mixture was kept mild refluxing (100° C.) to cause polymerization. Slight cooling was necessary to keep mild refluxing during the early part of the reaction while heating was necessary during the latter part. After three hours, the reaction was virtually complete and the product was diluted with 157 parts of water. The polymer syrup, now containing 33% resin solid, had a Gardner-Holdt viscosity of D measured at 25° C. By titration, all the chlorine was found to have been converted into the form of amine hydrochloride.

174 parts of the above polymer syrup (33%) were neutralized with 48.8 parts of 37.5% hydrochloric acid to form a complete polymeric amine hydrochloride. The intermediate product was further reacted with 84.5 parts of 96% potassium cyanate for one hour at 75° C. 162 parts of 37% formaldehyde were added. After aging at 55° C. for 30 minutes, the resin was diluted to 15% solid. The resin had excellent storage stability.

*Example 4*

297 parts of dichloroethane are reacted with 524.8 parts of 3,3'-iminobispropylamine in the presence of 180 parts of water at 80° C. for 4 hours. The resinous product is then diluted with 825 parts of water. The syrup, now containing 33% resin solid, has a viscosity of B+ measured on the Gardner-Holdt scale.

456 parts of the above resin syrup are taken out and 146.1 parts of 37.5% hydrochloric acid are added to form a complete amine hydrochloride salt. Sodium thiocyanate in an amount of 243 parts is added through a powder funnel. The reaction is allowed to take place at 50° C. After one hour, the reaction is substantially complete and 243 parts of 37% aqueous formaldehyde solution is charged. The mixture is refluxed for one hour and cooled.

*Example 5*

99 grams of 1,2-dichloroethane, 50 cc. of water and 146 grams of triethylenetetramine were mixed together and slowly heated to 65° C. An exothermic reaction developed which brought the mixture to reflux (80° C.). Cooling and heating were applied to maintain a gentle reflux. The solution was refluxed for about three hours during which time the temperature gradually rose to 100° C. The mixture was kept at 100–105° C. for 75 minutes. It was then cooled and 200 cc. of water were added to dilute the reaction product to 34.6% resin solids, or 49.5% total solids. Its viscosity on the Gardner-Holdt scale at 25° C. was between $A_1$ and A. By titration it was found that all the chlorine was converted to the form of chloride ions.

124 grams of the solution prepared as described above were neutralized with 48.6 grams of 37.5% hydrochloric acid and this, with the hydrogen chloride already present, was sufficient to neutralize all the nitrogen atoms present and thus form the complete amine salt. 84.5 grams of potassium cyanate of 96% purity were added and an exothermic reaction developed which brought the temperature to 80° C. The reaction mixture was kept at 75° C. for 30 minutes. 100 cc. of water and 162 grams of 37% formaldehyde were added and the reaction mixture was maintained at 70° C. for 30 minutes. The resulting syrup had a resin solids content of 15%. Its pH was 8.5.

In the preparation of cellulosic webs the webs are most conveniently manufactured by first forming a dilute aqueous dispersion of solution of the resin. No aging or pH adjustment is required. The solution is then added to an aqueous suspension of normally beaten cellulosic fibers. The resin in substantial part is rapidly adsorbed by the fibers. The fibers are sheeted in the ordinary way and the resulting webs heated to dry the same and develop the strengthening properties of the resin. Alternatively, the resin may be applied by the tub-sizing method wherein a preformed cellulosic web is dipped into or sprayed or padded with a dilute solution of the resin. The paper is then heated and dried as described.

A noticeable improvement in wet strength takes place when the paper carries as little as 0.01% by weight of the resin. Up to about 5% of the resin may be added with continued increase in the wet strength developed, but the greatest increase in strength produced per unit weight of resin added takes place within the range of about 0.25% to about 1%. The latter range is therefore particularly advantageous.

Curing of the resin takes place rapidly at any temperature between about 190–260° F. and curing is substantially (about 75%) complete when the paper is heated within that temperature range for a time only sufficient to dry the same. It is a particularly advantageous characteristic of the resin that the remainder of the curing takes place at room temperature and is practically complete within 10 to 14 days. As a result, the process of the present invention does not require any extended high temperature cure. Curing takes place more rapidly under acid conditions and, therefore, in normal operations the suspension is sheeted at pH values less than 7 and preferably about 4 to 6.

The resins of the present invention are insensitive to the presence of normal amounts of dissolved sulfate ions and thus the suspension may be made acid by addition of aluminum sulfate or sulfuric acid. Hence, the resins are particularly advantageously employed in systems wherein the fibers are sized with rosin or other soap or anionic size which is precipitated by alum, which furnishes large amounts of sulfate ions. In such systems the anionic size may be added first, then the alum which precipitates the size and acidifies the fibrous suspension to a pH of about 4 to 6, and finally the wet strength resin of the present invention is added at a point near the papermaking wire.

*Example 6*

Certain of the foregoing resin dispersions was diluted with water to a solids content of 2% by volume and employed in the manufacture of paper as follows:

A stock of bleached northern kraft pulp was prepared and beaten to a freeness of 500 milliliters (Green), diluted to a consistency of 0.6% and aliquots withdrawn.

One aliquot was retained as control and to this nothing was added. To other aliquots was added sufficient of the respective resin solutions shown above to provide the weights of resin solids shown in the table below.

After addition of the resin, the aliquots were stirred briefly to distribute the resin therethrough and their pH was adjusted to 4.5 by the addition of aqueous hydrochloric acid.

The aliquots were sheeted on a Nash handsheet machine using dilution water adjusted to a pH of 4.5 with hydrochloric acid and the handsheets were dried for one minute at 240° F. The sheets were then conditioned for about 24 hours at 73° F. and 50% relative humidity and were tested as shown in the table below. Results are as follows:

| Example | Resin Made From [1] | Percent Added [2] | Basis Wt.[3] | Tensile Strength [4] | |
|---|---|---|---|---|---|
| | | | | Dry | Wet [5] |
| 1 | IBPA + ClEtCl | 0.25 | 45.4 | 33.0 | 5.7 |
| 1 | IBPA + ClEtCl | 0.5 | 45.2 | 34.1 | 8.9 |
| 1 | IBPA + ClEtCl | 1.0 | 45.7 | 35.0 | 11.0 |
| 1 | IBPA + ClEtCl | 2.0 | 45.4 | 37.3 | 14.4 |
| 1 | IBPA + ClEtCl | 3.0 | 45.2 | 36.6 | 16.8 |
| 3 | TETA + ClPrCl | 0.5 | 48.4 | 34.0 | 7.8 |
| 3 | TETA + ClPrCl | 1.0 | 49.0 | 35.3 | 10.2 |
| 5 | TETA + ClEtCl | 0.5 | 46.0 | 29.4 | 1.6 |
| 5 | TETA + ClEtCl | 1.0 | 45.2 | 29.2 | 2.5 |
| Control | | Nil | 45.2 | 28.0 | 0.7 |

[1] TETA = triethylene tetramine; ClPrCl = 1,3-dichloropropane; ClEtCl = 1,2-dichloroethane; IBPA = 3,3'-iminobispropylamine.
[2] Resin solids on dry weight of fibers.
[3] Lb./25" x 40"/500 ream.
[4] Lb./inch, corrected to 50 lb. basis weight.
[5] After 16 hours soak in deionized water at 73° F.

From the table it will be seen that the results obtained with resin 1 and 3 were far superior to the results obtained with resin 5. The unsatisfactory performance of resin 5 was due to the fact that the sum of carbon atoms in the alkylene group in the amine and the carbon groups between the chlorine atoms of the chloroalkane was 4. The resin contained six-membered rings as a result of which the resin was of insufficient molecular size and length.

Subsequent laboratory work showed that substantially identical results are obtained when the pH adjustment referred to above is made by the use of sulfuric acid or alum. It has further been found that the greatest increase in wet strength per unit weight of resin added occurs when the resin solids is less than about 2% of the dry weight of the paper, and particularly less than about 1%, larger amounts acting to increase the wet strength but not in proportion to the weight of resin added.

From still further work, it has been found that the paper need only be heated at a temperature above about 180° F. until substantially dry to substantially develop the wet strength properties of the resin and that the remainder of the wet strength is developed as the paper ages on storage at room temperature, substantially all being developed during the first ten days thereof.

Reference is had to our copending application Serial No. 435,932, filed concurrently herewith on June 10, 1954.

We claim:
1. A process for preparing a resinous composition which comprises reacting dihaloalkane of the general formula

$$X-C_nH_{2n}-X$$

wherein X is a halogen having an atomic weight greater than 21 and $n$ is an integer of not more than 4 and containing at least 2 and not more than 3 chain carbon atoms between the halogen atoms thereof, and a polyalkylene polyamine of the general formula $$H_2N(C_mH_{2m}NY)_pC_mH_{2m}NH_2$$

wherein Y is selected from the group consisting of H and $C_mH_{2m}NH_2$, $m$ is an integer of from 2 to 4 and $p$ is an integer of from 0 to 4, in a mol ratio of from about 0.5:1 to about 1.2:1, respectively, at a temperature ranging from about 25° C. to reflux until the reaction product has a viscosity within the range of from about A to about T at 33% resin solids measured at 25° C. on the Gardner-Holdt scale and wherein the sum of the chain carbon atoms of said dihaloalkane and said polyamine employed is an integer of from 5 to 6, adding a sufficient amount of an acid to form the complete polyamine salt, reacting therewith a compound selected from the group consisting of alkali metal cyanate and alkali metal thiocyanate in the order of from about 0.9 to about 1.5 mols per atom of nitrogen in said salt until the exotherm ceases, and reacting therewith formaldehyde in the molar ratio of from about 1:1 to about 3:1 based on the mols of the compound selected from the group consisting of alkali metal cyanate and alkali metal thiocyanate present therein.

2. The product obtained by the process of claim 1.

3. A process for preparing a resinous composition which comprises reacting a dihaloalkane of the general formula $$X-C_nH_{2n}-X$$

where X is a halogen having an atomic weight greater than 21 and $n$ is an integer of not more than 4 and containing at least 2 and not more than 3 chain carbon atoms between the halogen atoms thereof, and a polyalkylene polyamine of the general formula $$H_2N(C_mH_{2m}NY)_pC_mH_{2m}NH_2$$

wherein Y is selected from the group consisting of H and $C_mH_{2m}NH_2$, $m$ is an integer of from 2 to 4 and $p$ is an integer of from 0 to 4, in a mol ratio of from about 0.7:1 to about 1:1, respectively, at a temperature ranging from about 50° C. to reflux until the reaction product has a viscosity within the range of from about B to about O at 33% resin solids measured at 25° C. on the Gardner-Holdt scale and wherein the sum of the chain carbon atoms of said dihaloalkane and said polyamine employed is an integer of from 5 to 6, adding a sufficient amount of an acid to form the complete polyamine salt, reacting therewith a compound selected from the group consisting of alkali metal cyanate and alkali metal thiocyanate in the order of from about 0.9 to about 1.5 mols per atom of nitrogen in said salt at a temperature within the order of from about 25° C. to reflux until the exotherm ceases, and reacting therewith formaldehyde in the molar ratio of from about 1:1 to about 2:1 based on the mols of the compound selected from the group consisting of alkali metal cyanate and alkali metal thiocyanate present therein.

4. A process for preparing a resinous composition which comprises reacting a dihaloalkane of the general formula $$X-C_nH_{2n}-X$$

wherein X is a halogen having an atomic weight greater than 21 and $n$ is an integer of not more than 4 and containing at least 2 and not more than 3 chain carbon atoms between the halogen atoms thereof, and a polyalkylene polyamine of the general formula $$H_2N(C_mH_{2m}NY)_pC_mH_{2m}NH_2$$

wherein Y is selected from the group consisting of H and $C_mH_{2m}NH_2$, $m$ is an integer of from 2 to 4 and $p$ is an integer of from 0 to 4, in a mol ratio of from about 0.7:1 to about 1:1, respectively, at a temperature ranging from about 50° C. to reflux until the reaction product has a viscosity within the range of from about B to about O at 33% resin solids measured at 25° C. on the Gardner-Holdt scale and wherein the sum of the chain carbon atoms of said dihaloalkane and said polyamine employed is an integer of from 5 to 6, adding a sufficient amount of an acid to form the complete polyamine salt, reacting therewith a compound selected from the group consisting of alkali metal cyanate and alkali metal thiocyanate in the order of from about 0.9 to about 1.5 mols per atom of nitrogen in said salt at a temperature within the order of from about 50° C. to about 80° C. until the exotherm ceases, and reacting therewith formaldehyde in the molar ratio of from about 1:1 to about 2:1 based on the mols of the compound selected from the group consisting of alkali metal cyanate and alkali metal thiocyanate present therein.

5. A process for preparing a resinous composition which comprises reacting ethylene dichloride and 3,3'-iminobispropylamine in a mol ratio of from about 0.5:1 to about 1.2:1, respectively, at a temperature ranging from about 25° C. to reflux until the reaction product has a viscosity within the range of from about A to about T at 33% resins solids measured at 25° C. on the Gardner-Holdt scale, adding a sufficient amount of hydrogen chloride to form the complete polyamine chloride salt, reacting therewith potassium cyanate in the order of from about 0.9 to about 1.5 mols per atom of nitrogen in said salt at a temperature within the order of from about 25° C. to reflux until the exotherm ceases, and reacting therewith formaldehyde in the molar ratio of from about 1:1 to about 3:1 based on the mols of potassium cyanate present therein.

6. A process for preparing a resinous composition which comprises reacting ethylene dichloride and 3,3'-iminobispropylamine in a mol ratio of from about 0.7:1 to about 1:1, respectively, at a temperature ranging from about 50° C. to reflux until the reaction product has a viscosity within the range of from about B to about O at 33% resins solids measured at 25° C. on the Gardner-Holdt scale, adding a sufficient amount of hydrogen chloride to form the complete polyamine chloride salt, reacting therewith potassium cyanate in the order of from about 0.9 to about 1.5 mols per atom of nitrogen in said salt at a temperature within the order of from about 50° C. to about 80° C. until the exotherm ceases, and reacting therewith formaldehyde in the molar ratio of from about 1:1 to about 2:1 based on the mols of potassium cyanate present therein.

7. The product obtained by the process of claim 6.

8. A process for preparing a resinous composition which comprises reacting a substantially neutralized high molecular weight polyalkylene polyamine salt obtained by acidifying the reaction product of a dihaloalkane and a polyalkylene polyamine in a mol ratio of from about 0.5:1 to about 1.2:1, respectively and having a viscosity within the range of from about A to about T at 33% resin solids measured at 25° C. on the Gardner-Holdt scale with a compound selected from the group consisting of alkali metal cyanate and alkali metal thiocyanate in the order of from about 0.9 to about 1.5 mols per atom of nitrogen in said salt until the exotherm ceases, and reacting therewith formaldehyde in the molar ratio of from about 1:1 to about 3:1 based on the mols of the compound selected from the group consisting of alkali metal cyanate and alkali metal thiocyanate present therein.

References Cited in the file of this patent

UNITED STATES PATENTS 2,616,874     Yost et al.  ---------------- Nov. 4, 1952

FOREIGN PATENTS 474,601     Great Britain ------------ Nov. 1, 1937